United States Patent
Iwakawa et al.

(10) Patent No.: US 8,021,572 B2
(45) Date of Patent: Sep. 20, 2011

(54) OPTICAL LAMINATE, POLARIZING PLATE, IMAGE DISPLAY, AND PROCESS FOR PRODUCING AN OPTICAL LAMINATE

(75) Inventors: Yasuko Iwakawa, Ibaraki (JP); Shusaku Nakano, Ibaraki (JP); Shoichi Matsuda, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 50 days.

(21) Appl. No.: 12/440,487

(22) PCT Filed: Oct. 31, 2007

(86) PCT No.: PCT/JP2007/071182
§ 371 (c)(1),
(2), (4) Date: Apr. 8, 2009

(87) PCT Pub. No.: WO2008/059715
PCT Pub. Date: May 22, 2008

(65) Prior Publication Data
US 2010/0067112 A1  Mar. 18, 2010

(30) Foreign Application Priority Data
Nov. 15, 2006 (JP) ................... 2006-309195

(51) Int. Cl.
C09K 19/06 (2006.01)
C09K 19/34 (2006.01)
C09K 19/32 (2006.01)
C09K 19/00 (2006.01)

(52) U.S. Cl. ......... 252/299.61; 252/299.01; 252/299.62; 252/299.6; 430/20; 428/1.1; 544/342

(58) Field of Classification Search ............. 252/299.01, 252/299.6–299.62; 428/1.1; 544/342; 430/20
See application file for complete search history.

(56) References Cited

U.S. PATENT DOCUMENTS

| 6,583,284 B1 | 6/2003 | Sidorenko et al. |
| 7,045,177 B2 | 5/2006 | Dutova et al. |
| 7,736,707 B2 * | 6/2010 | Matsuda et al. ............... 428/1.1 |
| 2002/0063819 A1 | 5/2002 | Yano et al. |
| 2005/0109986 A1 | 5/2005 | Dutova et al. |
| 2007/0279553 A1 | 12/2007 | Yoda et al. |

FOREIGN PATENT DOCUMENTS

| CN | 1854765 A | 11/2006 |
| JP | 2002-90531 A | 3/2002 |
| JP | 2006-267625 A | 10/2006 |
| JP | 2006-349998 A | 12/2006 |
| JP | 2007-512236 A | 5/2007 |
| KR | 20060097752 A | 9/2006 |
| WO | 2004/014874 A1 | 2/2004 |
| WO | 2005/051926 A1 | 6/2005 |
| WO | 2006/100901 A1 | 9/2006 |

OTHER PUBLICATIONS

International Search Report of PCT/JP2007/071182, mailing date of Dec. 18, 2007.
Chinese Office Action dated May 5, 2010, issued in corresponding Chinese Patent Application No. 200780037562.1.
Korean Office Action dated Sep. 24, 2010, issued in related Korean Patent Application No. 10-2009-7001900.
Chinese Office Action dated Apr. 19, 2011, issued in corresponding Chinese Patent Application No. 200780037562.1 with a partial English translation.

* cited by examiner

*Primary Examiner* — Geraldina Visconti
(74) *Attorney, Agent, or Firm* — Westerman, Hattori, Daniels & Adrian, LLP

(57) ABSTRACT

An object of the present invention is to provide a thin optical laminate a refractive index of which is three-dimensionally controlled.

The optical laminate of the present invention comprises a retardation layer containing a polycyclic compound having at least one of a $-SO_3M$ group and a $-COOM$ group, and having an index ellipsoid satisfying a relationship of $nx \leq nz > ny$; and a retardation layer having an index ellipsoid satisfying a relationship of $nx \geq ny > nz$.

As the polycyclic compound, for example, a quinoxaline derivative represented by the following formula (I) is used.

[Formula 1]

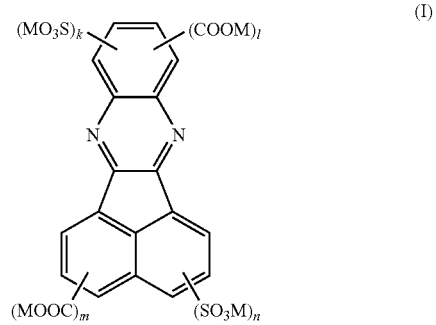

13 Claims, 1 Drawing Sheet

OPTICAL LAMINATE, POLARIZING PLATE, IMAGE DISPLAY, AND PROCESS FOR PRODUCING AN OPTICAL LAMINATE

TECHNICAL FIELD

The present invention relates to an optical laminate wherein at least two types of retardation layers different from each other in optical property are laminated, a process for producing the optical laminate, and others.

BACKGROUND ART

A liquid crystal display (hereinafter, also referred to as "LCD") is a device that displays characters and images using electro-optic properties of liquid crystal molecules. The LCD is widely used in portable phones, notebook computers, liquid crystal television, and the like.

However, the LCD makes use of liquid crystal molecules having optical anisotropy; therefore, the LCD has a problem that the LCD exhibits an excellent display property in one direction while the screen gets dark or unclear in other directions. In order to solve such a problem, a large number of birefringent films are used in the LCD. The birefringent film is also called a retardation layer, a retardation film, an optical compensation film or the like.

Hitherto, an optical laminate has been known wherein the following are laminated: a retardation film having an index ellipsoid satisfying a relationship of nx>nz>ny, and a retardation film having an index ellipsoid satisfying a relationship of nx=ny>nz (Patent Document 1).

As the retardation film having an index ellipsoid satisfying a relationship of nx>nz>ny, a polymeric film drawn to the thickness direction thereof as performed by the following method is generally used. That is, there is used a film obtained by adhering a contractile films onto both sides of a polymeric film, respectively, and drawing the resultant so as to be swelled into the thickness direction of the polymeric film by a contraction of the contractile films. For this reason, this retardation film is liable to become thick. Thus, an optical laminate wherein this retardation film is laminated cannot satisfy a desire that the optical laminate should be made thin and light.

Patent Document 1: JP-A-2002-90531

DISCLOSURE OF THE INVENTION

An object of the present invention is to provide a thin optical laminate a refractive index of which is three-dimensionally controlled.

Another object of the present invention is to provide a process for producing a thin optical laminate having layers even in thickness.

The inventors have made eager investigations, so as to find out that the objects can be attained by an optical laminate described below. Thus, the present invention has been made.

The present invention provides an optical laminate, comprising a retardation layer (A) containing a polycyclic compound having at least one of a —$SO_3M$ group and a —COOM group (the M represents a counter ion) and having an index ellipsoid satisfying a relationship of nx≧nz>ny, and a retardation layer (B) having an index ellipsoid satisfying a relationship of nx≧ny>nz.

In the optical laminate of the present invention, its retardation layer (A) contains the polycyclic compound having at least one of the —$SO_3M$ group and the —COOM group. The polycyclic compound exhibits a liquid crystal phase when the compound is in a solution state. Therefore, for example, when a solution containing this polycyclic compound is coated, the retardation layer (A) having the index ellipsoid satisfying the relationship of nx≧nz>ny can be formed. The retardation layer (A), which can be formed by coating as described above, can be made thin. Thus, the optical laminate that the retardation layer (A) is laminated is excellent in thin and light.

In the optical laminate, the retardation layer (B) satisfying the relationship of nx≧ny>nz is laminated onto the retardation layer (A) satisfying the relationship of nx≧nz>ny. For this reason, the optical laminate is useful as, for example, an optical member for improving a viewing angle of a liquid crystal display, and the like.

According to the present invention, it is possible to provide an optical laminate, which is excellent in thin and light and refractive index is three-dimensionally controlled. The optical laminate of the present invention is useful as, for example, an optical member for improving a viewing angle of an image display such as a liquid crystal display, and the like.

As the preferable optical laminate of the present invention, the above polymeric compound includes a compound represented by the following formula (I).

[Formula 1]

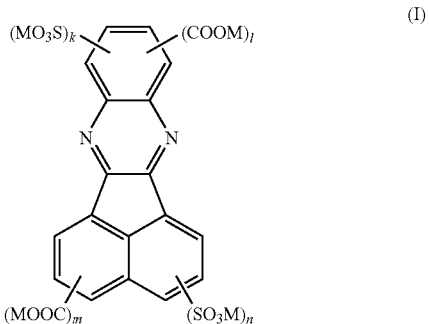

In the formula (I), M represents a counter ion, and k, l, m and n each represent a number of substitutions (k and l are each an integer of from 0 to 4, and m and n are each an integer of from 0 to 6). Here, k, l, m and n are not simultaneously 0.

The preferable optical laminate of the present invention contains the above retardation layer (B) contains a water-insoluble polymer.

The water-insoluble polymer is preferably at least one thermoplastic polymer selected from imide-based polymer, ester-based polymer, and amide-based polymer.

The preferable optical laminate of the present invention has a thickness of from 0.2 to 10 μm.

As the preferable optical laminate of the present invention, an in-plane birefringence index of the retardation layer (A) at wavelength of 590 nm ($\Delta n_{xy}[590]$) is 0.01 or more.

As the preferable optical laminate of the present invention, an Nz coefficient of the retardation layer (A) is from 0.1 to 0.9.

As the preferable optical laminate of the present invention, a birefringence index of the retardation layer (B) in the thickness direction at wavelength of 590 nm ($\Delta n_{xz}[590]$) is 0.01 or more.

As the preferable optical laminate of the present invention, an Nz coefficient of the retardation layer (B) is from 1.1 to 8.0.

The present invention provides a polarizing plate comprising any of the above optical laminate and a polarizer.

The present invention provides an image display comprising any of the above optical laminate or the above polarizing plate.

The present invention provides a process for producing an optical laminate comprising a step A of dissolving a polycyclic compound having at least one of a —SO$_3$M group and a —COOM group (the M represents a counter ion) into an aqueous solvent, thereby preparing a solution exhibiting a liquid crystal phase, a step B of preparing a solution containing a water-insoluble polymer and an organic solvent, a step C of coating the solution obtained in the step B onto a substrate, thereby forming a retardation layer (B) having an index ellipsoid satisfying a relationship of nx≧ny>nz, and a step D of subjecting a surface of this retardation layer (B) to hydrophilization treatment, and then coating the solution obtained in the step A thereon, thereby forming a retardation layer (A) having an index ellipsoid satisfying a relationship of nx≧nz>ny.

In the process of the present invention for producing the optical laminate, the retardation layer (B) containing the water-insoluble polymer is subjected to hydrophilization treatment, and then the solution wherein the polycyclic compound is dissolved in the aqueous solvent is coated thereon, thereby forming the retardation layer (A). For this reason, the surface of the retardation layer (B) is not eroded with the solution for forming the retardation layer (A), so that layers having no unevenness in thickness can be formed as the retardation layers (A) and (B).

Moreover, a thin optical laminate can be produced since the retardation layers (A) and (B) can be formed by coating.

Also, the present invention provides a process for producing an optical laminate comprising a step A of dissolving a polycyclic compound having at least one of a —SO$_3$M group and a —COOM group (the M represents a counter ion) into an aqueous solvent, thereby preparing a solution exhibiting a liquid crystal phase, a step B of preparing a solution containing a water-insoluble polymer and an organic solvent, a step E of coating the solution obtained in the step A onto a substrate, thereby forming a retardation layer (A) having an index ellipsoid satisfying a relationship of nx≧nz>ny, and a step F of coating the solution obtained in the step B onto a surface of this retardation layer (A), thereby forming a retardation layer (B) having an index ellipsoid satisfying a relationship of nx≧ny>nz.

The process for producing the optical laminate of the present invention forms the retardation layer (B) onto the surface of the retardation layer (A) containing the polycyclic compound which can be dissolved in the aqueous solvent by coating the solution prepared by dissolving the water-insoluble polymer into the organic solvent. For this reason, the surface of the retardation layer (A) is not eroded with the solution coated on the surface thereof to form the retardation layer (B). Thereby, the retardation layers (A) and (B) having no unevenness in thickness can be formed.

Also, a thin optical laminate can be produced since the retardation layers (A) and (B) can be formed by coating.

In the process for producing the optical laminate of the present invention, the above polycyclic compound is the compound represented as above formula (I)

BEST MODE FOR CARRYING OUT THE INVENTION

Optical Laminate of the Present Invention

An optical laminate of the present invention is laminated a retardation layer (A) containing a polycyclic compound having at least one of a —SO$_3$M group and a —COOM group (the M represents a counter ion) and having an index ellipsoid satisfying a relationship of nx≧nz>ny, and a retardation layer (B) having an index ellipsoid satisfying a relationship of nx≧ny>nz.

Herein, "nx≧nz>ny" and "nx≧ny>nz" denote optical anisotropies of the retardation layers (A) and (B). About each of the retardation layers (A) and (B), "nx" represents a refractive index thereof in a direction along which an in-plane refractive index is maximum (that is, the slow axis direction), "ny" represents a refractive index thereof in an in-plane direction orthogonal to the slow axis direction (that is, the fast axis direction), and "nz" represents a refractive index thereof in the thickness direction.

A transmittance of the optical laminate of the present invention at wavelength of 590 nm is preferably 85% or more, and more preferably 90% or more. A thickness of the optical laminate is preferably from 0.2 μm to 10 μm, and more preferably from 0.5 μm to 8 μm. Here, the method for measuring the transmittance is as will be described in Examples described later (the same matter is correspondingly applied to the following).

Figure 1:
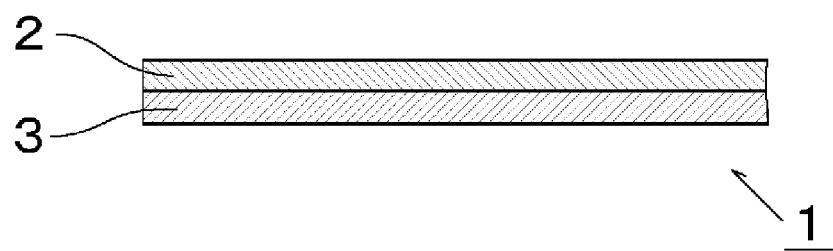
FIG. 1 is a sectional view illustrating an example of a layer structure of an optical laminate in one embodiment.
Figure 2:
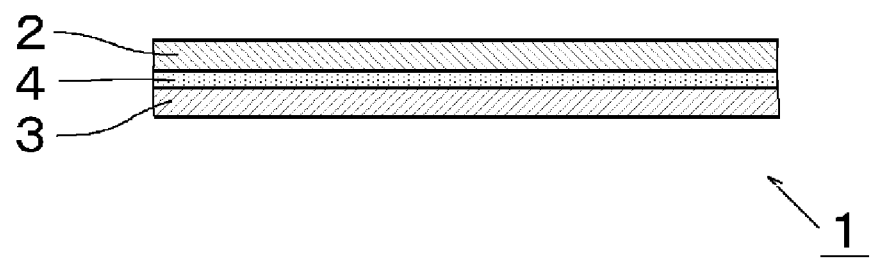
FIG. 2 is a sectional view of an example of a layer structure of an optical laminate in another embodiment.

FIGS. 1 and 2 are each an example of a layer structure of an optical laminate of the present invention. In the figures, the numeral 1 represents an optical laminate; the numeral 2 represents a retardation layer (A); the numeral 3 represents a retardation layer (B); and the numeral 4 represents an adhesive layer. In the optical laminate illustrated in FIG. 1, a retardation layer (A) and a retardation layer (B) are laminated adjacently to each other. In the optical laminate illustrated in FIG. 2, a retardation layer (A) and a retardation layer (B) are laminated to interpose an adhesive layer therebetween.

The adhesive layer is not particularly limited as far as it adheres and integrates the surfaces of adjacent layers with a practically sufficient adhering strength and an adhering time. Examples of the material for forming the adhesive layer include an adhesive agent, a pressure-sensitive adhesive agent, an anchor coat agent, and the like. The adhesive layer may be a multiple-layer structure in which an anchor coat agent layer is coated on a surface of a body, and an adhesive layer or a pressure-sensitive adhesive layer is formed thereon. The adhesive layer may be a thin layer (also referred to as a hair line) that is unrecognizable by a naked human eye. A thickness of the adhesive layer is preferably from 0.01 μm to 2 μm.

The optical laminate of the present invention will be described in more detail hereinafter. However, the present invention is not limited to the following specific embodiments.

[Retardation Layer (A)]

The retardation layer (A) contains a polycyclic compound having at least one of a —SO$_3$M group and a —COOM group, and the retardation layer (A) has an index ellipsoid satisfying a relationship of nx≧nz>ny.

Here, the retardation layer (A) may be a monolayer, or a multilayer.

The fundamental skeleton of the above polycyclic compound preferably has two or more of aromatic rings and/or heterocyclic rings, more preferably has three to eight of aromatic rings and/or heterocyclic rings, and particularly preferably has four to six of aromatic rings and/or heterocyclic rings. Also, it is preferable that the fundamental skeleton of the polycyclic compound preferably has at least a heterocyclic ring, and it is more preferable that the heterocyclic ring has a nitrogen atom. As the specific example of the fundamental skeleton of the polycyclic compound, a quinoxaline derivative is exemplified.

As a quinoxaline derivative having at least one of a $-SO_3M$ group and a $-COOM$ group, an acenaphtho[1,2-b]quinoxaline derivative represented by the following general formula (I) is exemplified. In the general formula (I), k and l are each independently an integer from 0 to 4, m and n are each independently an integer from 0 to 6, and M represents a counter ion. Here, k, l, m and n are not simultaneously 0. The retardation layer (A) may be formed of a composition containing two or more compounds, which are each represented by the general formula (I) and are different from each other in the substitution position or the substitution number of one or more $-SO_3M$ groups and/or one or more $-COOM$ groups.

The above M is preferably a hydrogen atom, an alkali metal atom, an alkaline earth metal atom, a metal ion, or a substituted or unsubstituted ammonium ion. The metal ion includes, for example, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, or the like.

In the formula (I), M may be appropriately selected from these ions.

When the retardation layer (A) is formed from, for example, an aqueous solution, M in the formula (I) is preferably selected from groups for improving solubility in water. The compound of the formula (I) into which such a water-solubility-improving group is introduced is easily dissolved in an aqueous solvent. After an aqueous solution of this compound is coated and formed into a film onto a substrate so as to form the retardation layer (A), the water-solubility-improving group may be substituted with a group insoluble in water or slightly soluble in water in order to make a water resistance high.

[Formula 2]

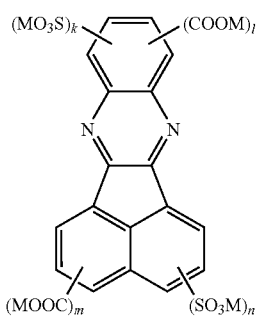

(I)

The above acenaphtho[1,2-b]quinoxaline derivative represented as the above formula (I) can be obtained, for example, by sulfonation of acenaphtho[1,2-b]quinoxaline or carboxylic acid thereof with sulfuric acid, fuming sulfuric acid, chlorosulfonic acid, or the like as shown in the following formula (a). In the formula (a), k, l, m, n, and M are similar to those in the general formula (I) (k and n are not simultaneously 0).

[Formula 3]

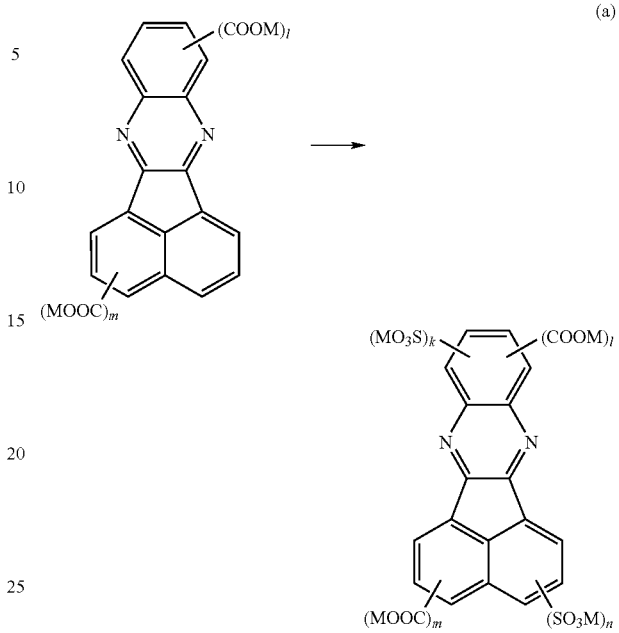

(a)

Also, the above acenaphtho[1,2-b]quinoxaline derivative can be obtained, for example, by condensation reaction of sulfo and/or carboxy derivative of benzene-1,2-diamine with sulfo and/or carboxy derivative of acenaphthoquinone as shown in the following formula (b). In the formula (b), k, l, m, n, and M are similar to those in the general formula (I) (k, l, m, and n are not simultaneously 0).

[Formula 4]

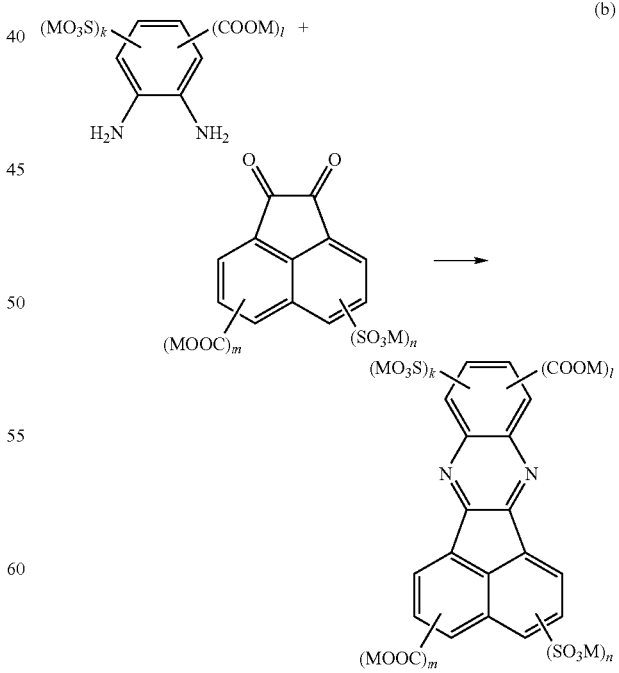

(b)

The above polycyclic compound preferably exhibits a liquid crystal phase (namely, lyotropic liquid crystal) in a solution state. Here, this liquid crystal phase is preferably a nematic liquid crystal phase in view of being excellent in alignment. This nematic liquid crystal phase includes those that forms a super molecule and whose formation is in a nematic state.

The retardation layer (A) may be formed, for example, by forming a solution containing the polycyclic compound into a film form. When the polycyclic compound is used, the retardation layer (A) may be formed by preparing the compound into a solution form and carrying out a solvent casting method from the solution. The formed retardation layer (A) has good optical properties that the layer is excellent in transparency and high in an in-plane birefringence index and exhibits no absorbance or slight absorbance in the visible ray range. The method for forming the retardation layer (A) will be described in detail below.

The retardation layer (A) of the present invention is formed by coating, therefore, can be made thin. Also, the retardation layer (A) has an index ellipsoid satisfying a relationship of $nx \geq nz > ny$ ($nx > nz > ny$ or $nx = nz > ny$) and exhibits a high in-plane birefringence index. For this reason, the retardation layer (A) of the present invention has an outstandingly thin thickness as compared with the conventional birefringent film and a desired retardation value. Here, in the present specification, "nx=nz" includes a case in which nx and nz are substantially identical in addition to a case in which nx and nz are completely identical. The case in which nx and nz are substantially identical refers, for example, to a case in which an Rth[590] is from −10 nm to 10 nm, and preferably from −5 nm to 5 nm.

The inventors assume the reason why the retardation layer (A) exhibits a high birefringence index as follows: the polycyclic compound having a —$SO_3M$ group and/or a —COOM group easily forms an aggregate in a solution, and the orderliness of the state that this aggregate is formed is high, so that the retardation layer made from this solution also exhibits a high alignment; thus, it appears that a highly birefringent retardation layer (A) can be formed. The effect of the —$SO_3M$ group and/or the —COOM group contained in this polycyclic compound onto the retardation layer (A) is classified into the following two: an effect of improving the solubility of the polycyclic compound in the aqueous solvent so as to permit a film to be formed by a solvent casting method; and another effect of controlling the refractive index three-dimensionally so as to yield the index ellipsoid satisfying the relationship of $nx \geq nz > ny$.

A transmittance of the retardation layer (A) at wavelength of 590 nm is preferably 85% or more, and more preferably 90% or more. A thickness of the retardation layer (A) is preferably from 0.05 μm to 5 μm, and more preferably from 0.1 μm to 5 μm.

An in-plane birefringence index of the retardation layer (A) at wavelength of 590 nm ($\Delta n_{xy}[590]=nx-ny$) is preferably 0.01 or more, more preferably 0.05 or more, and particularly preferably from 0.1 to 0.5. Here, the $\Delta n_{xy}[590]$ can be suitably adjusted within the above range by the molecular structure of the polycyclic compound.

By use of the —$SO_3M$ group- and/or —COOM group-containing polycyclic compound, the retardation layer (A) that satisfies such properties can be obtained.

An in-plane retardation value of the retardation layer (A) at wavelength of 590 nm ($Re_{A}[590]$) can be set to be a suitable value in accordance with an object. The above $Re_{A}[590]$ is 10 nm or more, and preferably from 20 nm to 300 nm. Here, the in-plane retardation value ($Re_A[\lambda]$) refers to a retardation value in the plane of the retardation layer (A) at wavelength of $\lambda$ (nm) at 23° C. The $Re_A[\lambda]$ can be determined by $Re_A[\lambda]=(nx-ny) \times d$, where the thickness of the retardation layer (A) is d (nm).

The $Rth_A[590]$ of the retardation layer (A) can be set to be a suitable value within a range in which the index ellipsoid satisfies the relationship of $nx \geq nz > ny$. The difference between the in-plane retardation value ($Re_A[590]$) and a retardation value in the thickness direction ($Rth_A[590]$) of the retardation layer (A) at wavelength of 590 nm ($Re_A[590]-Rth_A[590]$) is preferably from 10 nm to 200 nm, and more preferably from 20 nm to 200 nm. Here, the retardation value in the thickness direction ($Rth_A[\lambda]$) refers to the retardation value in the thickness direction of the retardation layer (A) at wavelength of $\lambda$ (nm) at 23° C. The $Rth_A[\lambda]$ can be determined by $Rth_A[\lambda]=(nx-nz) \times d$, where the thickness of the retardation layer (A) is d (nm).

An Nz coefficient of the retardation layer (A) is preferably from −0.1 to 0.9, more preferably from 0 to 0.9, particularly preferably from 0.1 to 0.9, and most preferably from 0.1 to 0.7. When the Nz coefficient is within the above range, the retardation layer (A) can be used for optical compensation of liquid crystal cells in various driving modes. Here, the Nz coefficient is a value calculated from $Rth_A[590]/Re_A[590]$.

Also, a wavelength dispersion value (D) of the retardation layer (A) is preferably 1.05 or more, and more preferably from 1.06 to 1.15. Here, the wavelength dispersion value (D) is a value calculated from the formula; $D=Re_A[480]/Re_A[550]$. Conventionally, out of birefringent films each produced by drawing a polymeric film, a film exhibiting such a steep wavelength dependency has never been obtained. About the retardation layer (A) in the present invention, a retardation value measured through light having a short wavelength is sufficiently larger than a retardation value measured through light having a long wavelength. That the retardation layer (A) exhibiting such a steep wavelength dependency is laminated is also a characteristic of the optical laminate of the present invention.

[Retardation Layer (B)]

The retardation layer (B) has an index ellipsoid satisfying a relationship of $nx \geq ny > nz$ ($nx > ny > nz$ or $nx = ny > nz$). Here, in the present specification, "nx=ny" includes a case in which nx and ny are substantially identical in addition to a case in which nx and ny are completely identical. The case in which nx and ny are substantially identical refers, for example, to a case in which an $Rth_B[590]$ (retardation value in the thickness direction of the retardation layer (B) at wavelength of 590 nm) is less than 10 nm, and preferably less than 5 nm.

The retardation layer (B) preferably contains a water-insoluble polymer as a main component. The polymer is, for example, a non-liquid-crystal polymer. The non-liquid-crystal polymer is preferably a thermoplastic polymer. The water-insoluble polymer denotes a polymer that is not substantially dissolved in water. Preferable examples of the water-insoluble polymer include polymers exhibiting a solubility of 0.1 g or less in 100 g of pure water at 23° C. in temperature.

The retardation layer (B) may be a mono-layered structure or multi-layered structure.

Examples of the water-insoluble polymer, which forms the retardation layer (B), are preferably thermoplastic polymers containing at least one selected from imide-based polymer, ester-based polymer, or amide-based polymer. These polymers may be, for example, polymers described in U.S. Pat. Nos. 5,071,997, 5,344,916, 5,480,964, 5,395,918, 5,580,950, and the like. About such polymers, a rigidity of their main chains is easily controlled and a $\Delta n_{xz}[590]$ can be made high; thus, the retardation layer (B) that is small in thickness can be obtained.

Preferably, the retardation layer (B) contains an imide-based polymer. The imide-based polymer preferably contains a hexafluoroisopropylidene group and/or trifluoromethyl group. It is more preferable that the imide-based polymer has at least a repeat unit represented by the following general formula (II) or a repeat unit represented by the following general formula (III). The imide-based polymers containing these repeat units are excellent in transparency and solubility in general solvents, and have a large birefringence index in the thickness direction.

[Formula 5]

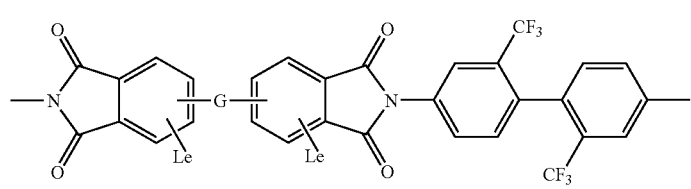

(II)

[Formula 6]

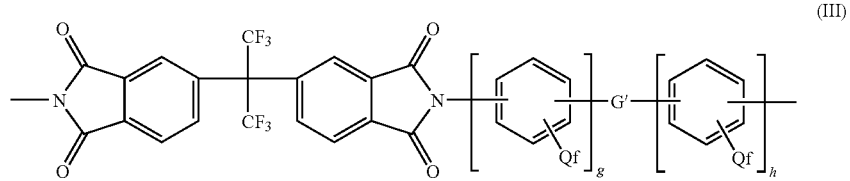

(III)

In the above general formulae (II) and (III), G and G' represent a covalent bond or a group respectively independently selected from the group consisting of $CH_2$ group, $C(CH_3)_2$ group, $C(CF_3)_2$ group, $C(CX_3)_2$ group (X is halogen), CO group, oxygen, sulfur, $SO_2$ group, $Si(CH_2CH_3)_2$ group, and $N(CH_3)$ group. The G and G' may be respectively the same or different.

In the above general formula (II), L represents a substituent group, and the e represents a number of substitutions thereof. The L is, for example, a halogen, alkyl group having from 1 to 3 carbons, phenyl group, or substituted phenyl group, and, in the case where plural L are present, they are respectively the same or different. The number e is an integer from 0 to 3.

In the above general formula (III), Q represents a substituent group, and the f represents a number of substitutions thereof. The Q is, for example, an atom or a group selected from the group consisting of hydrogen, halogen, alkyl group, substituted alkyl group, nitro group, cyano group, thioalkyl group, alkoxy group, aryl group, substituted aryl group, alkylester group, and substituted alkylester group, and, in the case where plural Q are present, they are respectively the same or different. The number f is an integer from 0 to 4, and the number g and h are an integer from 1 to 3.

The above imide-based polymer may be obtained, for example, by reacting a tetracarboxylic acid dianhydride with a diamine. The repeat unit represented by the general formula (II) may be obtained by reacting 2,2'-bis(trifluoromethyl)-4,4'-diaminobiphenyl (this compound is the diamine) with a tetracarboxylic acid dianhydride having at least two aromatic rings. The repeat unit represented by the general formula (III) may be obtained by reacting 2,2-bis(3,4-dicarboxylphenyl) hexafluoropropanoic acid dianhydride (this compound is the tetracarboxylic acid dianhydride) with a diamine having at least two aromatic rings. This reaction may be a chemical imidization run in two stages or a thermal imidization run in one stage.

As the tetracarboxylic acid dianhydride, an optional and appropriate one is selected. Examples of the tetracarboxylic acid dianhydride include 2,2-bis(3,4-dicarboxyphenyl) hexafluoropropanoic acid dianhydride, 3,3',4,4'-benzophenonetetracarboxylic acid dianhydride, 2,3,3',4-benzophenonetetracarboxylic acid dianhydride, 2,2',3,3'-benzophenonetetracarboxylic acid dianhydride, 2,2'-dibromo-4,4',5,5'-biphenyltetracarboxylic acid dianhydride, 2,2'-bis(trifluoromethyl)-4,4',5,5'-biphenyltetracarboxylic acid dianhydride, 3,3',4,4'-biphenyltetracarboxylic acid dianhydride, 4,4'-bis(3,4-dicarboxyphenyl)ether dianhydride, 4,4'-oxydiphthalic acid dianhydride, 4,4'-bis(3,4-dicarboxyphenyl)sulfonic acid dianhydride, bis(2,3-dicarboxyphenyl)methanoic acid dianhydride, and bis(3,4-dicarboxyphenyl)diethylsilanoic acid dianhydride.

As the above diamine, an optional and appropriate one is selected. Examples of the above diamine include 2,2'-bis(trifluoromethyl)-4,4'-diaminobiphenyl, 4,4'-diaminobiphenyl, 4,4'-diaminophenylmethane, 4,4'-(9-fluorenylidene)-dianiline, 3,3'-dichloro-4,4'-diaminodiphenylmethane, 2,2'-dichloro-4,4'-diaminobiphenyl, 4,4'-diaminodiphenyl ether, 3,4'-diaminodiphenyl ether, 4,4'-diaminodiphenylsulfone, and 4,4'-diaminodiphenyl thioether.

A weight-average molecular weight (Mw) of the imide-based polymer is preferably from 20,000 to 180,000. The weight-average molecular weight (Mw) may be found by using a dimethylformamide solution (1 L of a dimethylformamide solution by adding 10 mM of lithium bromide and 10 mM of phosphoric acid to adjust its volume) as a developing solution based on polyethylene oxide. An imidization ratio of the imide-based polymer is preferably 95% or more. The imidization ratio can be found from an integral intensity ratio of a proton peak derived from polyamic acid that is polyimide precursor to a proton peak derived from polyimide.

The retardation layer (B) containing the imide-based polymer can be obtained by any appropriate shape-form method. The retardation layer (B) containing the imide-based polymer can be preferably formed into a sheet form by a solvent casting method. The resultant film may be optionally drawn by longitudinal uniaxial drawing method, or lateral uniaxial drawing method.

A transmittance of the retardation layer (B) at wavelength of 590 nm is preferably 85% or more, and more preferably 90% or more. A thickness of the retardation layer (B) is preferably from 0.1 μm to 8 μm, and more preferably from 0.5 μm to 5 μm.

A birefringence index in the thickness direction of the retardation layer (B) at wavelength of 590 nm ($\Delta n_{xz}[590]$=nx−nz) is preferably 0.01 or more, more preferably from 0.01 to 0.08. This $\Delta n_{xz}[590]$ can be appropriately increased or decreased by controlling a rigidity of a main chain of the polymer, which is a material for forming the retardation layer (B).

When the retardation layer (B), which has the index ellipsoid satisfying the relationship of nx≧ny>nz, is used in a liquid crystal display, it is possible to attain satisfactorily an optical compensation of a liquid crystal cell satisfying, for example, a relationship of nz>nx≧ny (for example, a liquid crystal cell in a vertically-aligned mode).

A retardation value in the thickness direction of the retardation layer (B) at wavelength of 590 nm ($Rth_B[590]$) is preferably from 20 nm to 800 nm, and more preferably from 20 nm to 400 nm. Here, the retardation value in the thickness direction ($Rth_B[\lambda]$) refers to the retardation value in the thickness direction of the retardation layer (B) at wavelength of $\lambda$ (nm) at 23° C.

In the case that the index ellipsoid of the retardation layer (B) satisfies the relationship of nx=ny>nz, an in-plane retardation value thereof ($Re_B[590]$) at wavelength of 590 nm is less than 10 nm, and more preferably 5 nm or less. On the other hand, in the case that the index ellipsoid of the retardation layer (B) satisfies the relationship of nx>ny>nz, an in-plane retardation value thereof ($Re_B[590]$) at wavelength of 590 nm is preferably 10 nm or more, and more preferably from 20 nm to 300 nm. Here, the in-plane retardation value ($Re_B[\lambda]$) refers the in-plane retardation value of the retardation layer (B) at wavelength of $\lambda$ (nm) at 23° C.

An Nz coefficient of the retardation layer (B) is preferably from 1.1 to 8.0, and more preferably from 1.3 to 6.0. When the Nz coefficient is within the above range, the retardation layer (B) can be used for optical compensation of liquid crystal cells in various driving modes. Here, the Nz coefficient is a value calculated from $Rth_B[590]/Re_B[590]$.

<Process for Producing Optical Laminate>

An optical laminate of the present invention may be produced by any appropriate process. Examples of the process for producing the optical laminate include a process (1) of coating a solution for forming the retardation layer (A) onto the surface of the retardation layer (B) formed in advance; a process (2) of coating a solution for forming the retardation layer (B) onto the surface of the retardation layer (A) formed in advance; and a process (3) of forming the retardation layer (A) and the retardation layer (B) separately, and then laminating and adhering the layers (A) and (B) onto each other through an adhesive layer.

The process (1) or (2) is preferable since the optical laminate can be formed into a thinner form and number of steps therein is also small.

(Production Process Example 1 of Optical Laminate)

An embodiment of the process of the present invention for producing an optical laminate has the following steps A to D:

step A: a step of dissolving a polycyclic compound having at least one of a —$SO_3M$ group and a —COOM group (the M represents the above counter ion) into an aqueous solvent, thereby preparing a solution exhibiting a liquid crystal phase, step B: a step of preparing a solution containing a water-insoluble polymer and an organic solvent, step C: a step of coating the solution obtained in the step B onto a substrate, and drying the resultant, thereby forming a retardation layer (B) having an index ellipsoid satisfying a relationship of nx≧ny>nz, and step D: a step of subjecting a surface of this retardation layer (B) to hydrophilization treatment, coating the solution obtained in the step A thereon, and drying the resultant, thereby forming a retardation layer (A) having an index ellipsoid satisfying a relationship of nx≧nz>ny.

About the step A and the step B, any one thereof may be performed on ahead, or the steps may be performed in parallel to each other.

[Step A]

The step A is a step for preparing a solution containing the polycyclic compound (hereinafter referred to as a solution (A)).

Since the polycyclic compound is water-soluble by effect of the —$SO_3M$ group and/or the —COOM group, the compound can be dissolved in an aqueous solvent. The aqueous solvent is preferably water.

In the case of using water as the solvent, an electric conductivity of water is preferably 20 μS/cm or less (lower limit of 0 μS/cm), more preferably from 0.001 to 10 μS/cm, and particularly preferably from 0.01 to 5 μS/cm. By using a solution in which the electric conductivity of water is within the above range, a retardation layer (A) being excellent in uniformity in the plane can be obtained. Here, the electric conductivity can be measured by using a solution electric conductivity meter (Kyoto Electronics Manufacturing Co., Ltd., product name "CM-117").

The solution (A) may be obtained by dissolving a single species of the polycyclic compound or two or more species thereof different from each other in structure into an aqueous solvent such as water. A concentration of the polycyclic compound in the solution (A) is not particularly limited, and is preferably from 5% to 40% by mass, more preferably from 5% to 35% by mass, and particularly preferably from 5% to 30% by mass since the polycyclic compound in the solution exhibits a stable nematic liquid crystal phase. The nematic liquid crystal phase can be identified or distinguished on the basis of an optical pattern of the liquid crystal phase observed with a polarizing microscope.

A pH of the solution (A) is preferably prepared from about 4 to 10, and more preferably from about 6 to 8.

Further, the solution (A) may be added an additive agent. Examples of the additive agent include a plasticizer, a thermal stabilizer, an optical stabilizer, a lubricant, an antioxidant, an ultraviolet absorber, a flame retardant, a coloring agent, an antistatic agent, a compatibility improving agent, a cross-linking agent, and a thickening agent. An amount of addition of these additive agents is preferably more than 0 and 10 parts or less by mass based on 100 parts by mass of the solution (A).

Further, a surfactant may be added to the solution (A). The surfactant is added for improving wettability and coating property of the polycyclic compound onto the surface of the substrate. As the surfactant, a nonionic surfactant is preferably used. An additive amount of the surfactant is preferably more than 0 and 5 parts or less by mass based on 100 parts by mass of the solution (A).

[Step B]

The step B is a step for preparing a solution containing a water-insoluble polymer (hereinafter referred to as the solution (B)) in order to form a retardation layer (B).

The water-insoluble polymer is as described above, and is preferably at least one thermoplastic polymer selected from imide-based polymer, ester-based polymer, and amide-based polymer. Imide-based polymer is particularly preferred.

The solution (B) can be obtained by dissolving the water-insoluble polymer into an organic solvent.

The organic solvent is not particularly limited as far as the solvent is a substantially water-insoluble solvent, in which the water-insoluble polymer can be dissolved. The solvent may be appropriately decided in accordance with the kind of the polymer. Specific examples of the organic solvent include halogenated hydrocarbons such as chloroform, dichloromethane, carbon tetrachloride, tetrachloroethylene, chlorobenzene, and ortho-dichlorobenzene; phenols such as phenol, and para-chlorophenol; aromatic hydrocarbons such as benzene, toluene, xylene, methoxybenzene, and 1,2-dimethoxybenzene; ketone-based solvents such as methyl ethyl ketone, methyl isobutyl ketone, cyclohexanone, cyclopentanone, 2-pyrrolidone, and N-methyl-2-pyrrolidone; ester-based solvents such as ethyl acetate, and butyl acetate; higher alcohol-based solvents such as ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide, and dimethylacetoamide; nitrile-based solvents such as acetonitrile, and butyronitrile; carbon disulfide, ethylcellosolve, butylcellosolve, and the like. These solvents may be used alone or in the form of a mixture of two or more thereof.

Here, an organic solvent which causes phase separation when the solvent and pure water are mixed with each other at a mass ratio of 1:1 falls under the substantially water-insoluble solvent.

An additive may be optionally added to the solution (B) as far as optical properties of the retardation layer (B) to be formed are not damaged. Examples of the additive include an ultraviolet absorbent, a stabilizer, a plasticizer, a metal, an antistatic agent, and the like.

[Step C]

The step C is a step for forming the retardation layer (B) having the index ellipsoid satisfying the relationship of nx≧ny>nz.

The solution (B) prepared in the step B is coated onto an appropriate substrate.

The substrate, onto which the solution (B) is to be coated, is not particularly limited, and is, for example, a substrate made of an organic compound, such as a plastic substrate, or a substrate made of an inorganic compound, such as a glass substrate or a silicon wafer. The plastic substrate is, for example, a polymeric film formed by a casting method or the like, a polymeric film obtained by forming a melted polymer into a film form and then subjecting the resultant to drawing treatment, and the like. Of these substrates, a plastic substrate having a mechanical strength increased by drawing treatment is preferable since the substrate can attain a high coating-precision.

As a method of coating the solution (B) on a surface of the substrate, a coating method using a proper coater is used. The coater is, for example, a reverse roll coater, a positive rotation roll coater, a gravure coater, a rod coater, a slot die coater, a slot orifice coater, a curtain coater, or a fountain coater. A retardation layer (B) having small unevenness in thickness can be obtained by adopting the coating method using the above coater.

As a method of drying the solution (B) coated on the substrate, a proper and appropriate drying method can be adopted. As the drying method, for example, an air-circulation type thermostatic oven by which hot air or cool air circulates, a heater using a microwave, a far infrared ray, or the like, a roll heated for temperature adjustment, a heat pipe roll, or a metal belt can be used.

The drying temperature is below or equal to an isotropic phase transition temperature of the solution, and it is preferable to raise the temperature gradually from low temperature to high temperature. The drying temperature is preferably from 10° C. to 80° C., more preferably from 20° C. to 60° C. Within such a temperature range, a retardation layer (B) having small unevenness in thickness can be obtained.

The drying time can be suitably selected in accordance with the drying temperature and the kind of the solvent. The drying time is, for example, 1 to 30 minutes, preferably 1 to 10 minutes in order to obtain a retardation layer (B) having small unevenness in thickness.

[Step D]

The step D is a step for coating the solution (A) obtained in the step A onto the retardation layer (B) formed in the step C, thereby forming the retardation layer (A) having the index ellipsoid satisfying the relationship of nx≧nz>ny.

When the solution (A) is coated, a surface of the retardation layer (B) is first subjected to hydrophilization treatment.

Here, the hydrophilization treatment is a treatment for lowering the contact angle of water on the retardation layer (B). The hydrophilization treatment is conducted to improve wettability and coatability of the solution (A) containing aqueous solvent on the surface of the retardation layer (B).

The hydrophilization treatment is a treatment of reducing a contact angle of water on the retardation layer (B) at 23° C. by preferably 10% or more, more preferably from 15% to 80%, and particularly preferably from 20% to 70% comparing with the contact angle before the treatment. Here, a ratio to reduce the contact angle (%) can be measured by a formula: {(Contact angle before treatment−Contact angle after treatment)/Contact angle before treatment}×100. The contact angle can be measured with a solid-liquid interface analyzer (trade name: "prop Master 300" manufactured by Kyowa Interface Science Co., Ltd., a static contact angle is measured after a lapse of 5 seconds from a time when 0.5 μL of a droplet is dropped).

Furthermore, the hydrophilization treatment is a treatment of adjusting the contact angle of water on the retardation layer (B) at 23° C. within a range from preferably 5° to 60°, more preferably 5° to 50°, and particularly preferably 5° to 45°. When the contact angle of water of the retardation layer (B) is within the above range, a retardation layer (A) having a high in-plane birefringence index and small unevenness in thickness can be obtained.

The hydrophilization treatment can be any suitable method. For example, the hydrophilization treatment can be a dry treatment or a wet treatment. The dry treatment is, for example, a discharge treatment such as a corona treatment, a plasma treatment, or a glow discharge treatment; a flame treatment; an ozone treatment; an LTV ozone treatment; and an ionization active ray treatment such as an ultraviolet treatment or an election beam treatment. The wet treatment is, for example, an ultrasonic treatment using a solvent such as water or acetone, an alkali treatment, or an anchor coat treatment. These treatments can be used alone or in combination of two or more thereof.

Preferably, the hydrophilization treatment is a corona treatment, a plasma treatment, an alkali treatment, or an anchor coat treatment. By the hydrophilization treatment, a retardation layer (A) having a high alignment and small unevenness in thickness can be obtained. The conditions of the hydrophilization treatment (for example, a treatment time or a strength) can be properly adjusted so as to the contact angle of water of the retardation layer (B) to be within the above range.

The typical corona treatment is a treatment of modifying a surface of the retardation layer (B) by passing through the retardation layer (B) in a corona discharge. The corona discharge occurs by applying high frequency and high voltage to a space between a grounded dielectric roll and an insulated electrode, breaking the insulation of an air between electrodes, and ionizing the air. The typical plasma treatment is a treatment of modifying a surface of the retardation layer (B) by passing through the retardation layer (B) in low temperature plasma. The low temperature plasma occurs by generating a glow discharge in an inorganic gas such as low-pressure inert gas, oxygen or halogen gas, and ionizing a part of a gas molecule. The typical ultrasonic treatment is a treatment of improving wettability of the retardation layer (B) by dipping the retardation layer (B) in water or an organic solvent, applying ultrasonic to the retardation layer (B), and removing contaminants on a surface of the retardation layer (B). The typical alkali treatment is a treatment of modifying a surface of the retardation layer (B) by dipping the retardation layer (B) in an alkali treatment solution prepared by dissolving a basic material in water or an organic solvent. The typical anchor coat treatment is to coat an anchor coat agent on a surface of the retardation layer (B).

The method for coating the solution (A) onto the retardation layer (B) subjected to hydrophilization treatment may be performed in accordance with the method described in the step C.

A coating rate of the solution (A) is preferably 50 mm/second or more, and more preferably 100 mm/second or more. When the coating rate of the solution (A) is set into this range, a shearing force suitable for aligning the polycyclic compound is applied to the solution (A) so that a retardation layer (A) can be obtained which has a high in-plane birefringence index and a small unevenness in thickness.

A method for drying the coated solution (A), a temperature therefor, and a time therefor may be performed in accordance with those in the method described in the step C.

After the step D, the following step D1 may be performed.
[Step D1]

The step D1 is a step for giving water resistance to a surface of the formed retardation layer (A) (a surface opposite to the jointed surface of the retardation layer (B)).

Specifically, the surface of the retardation layer (A) formed in the above step D is brought into contact with a solution containing a compound salt. The compound salt is at least one kind of a compound salt selected from the group consisting of aluminum salt, barium salt, lead salt, chromium salt, strontium salt, and compound salts having two or more amino groups within a molecule.

Examples of the above compound salt include aluminum chloride, barium chloride, lead chloride, chromium chloride, strontium chloride, 4,4'-tetramethyldiaminodiphenylmethane hydrochloride, 2,2'-dipyridyl hydrochloride, 4,4'-dipyridyl hydrochloride, melamine hydrochloride, tetraminopyrimidine hydrochloride, and the like. By forming a layer of such a compound salt on the surface of the retardation layer (A), the surface of the retardation layer (A) can be made insoluble or slightly soluble to water. Therefore, an optical laminate excellent in water resistance can be provided.

In the solution containing the above compound salt, a concentration of the compound salt is preferably from 3% to 40% by mass, and more preferably from 5% to 30% by mass.

As a method of bringing the solution containing the above compound salt into contact with the surface of the retardation layer (A), one can adopt, for example, a method of coating the solution containing the above compound salt onto the surface of the retardation layer (A), a method of immersing the retardation layer (A) into the solution containing the above compound salt, or the like. In the case that these methods are adopted, the retardation layer (A) is preferably washed with water or an arbitrary solvent.

After the washing, the resultant is further dried to make it possible to yield an optical laminate wherein the retardation layers (B) and (A) adhere sufficiently closely to each other in the interface therebetween.
(Production Process Example 2 of Optical Laminate)

Another embodiment of the process for the present invention has the following steps A, B, E and F:

step A: a step of dissolving a polycyclic compound having at least one of a —$SO_3M$ group and a —COOM group (the M represents the above counter ion) into an aqueous solvent, thereby preparing a solution exhibiting a liquid crystal phase, step B: a step of preparing a solution containing a water-insoluble polymer and an organic solvent, step E: a step of coating the solution obtained in the step A onto a substrate, and drying the resultant, thereby forming a retardation layer (A) having an index ellipsoid satisfying a relationship of $nx \geq nz > ny$, and step F: a step of coating the solution obtained in the step B onto the surface of the retardation layer (A), and drying the resultant, thereby forming a retardation layer (B) having an index ellipsoid satisfying a relationship of $nx \geq ny > nz$.

About the step A and the step B, any one thereof may be performed on ahead, or the steps may be performed in parallel to each other.
[Steps A and B]

The steps A and B are as described in the production process example 1; thus, the description should be referred to.
[Step E]

The step E is a step for forming the retardation layer (A) having the index ellipsoid satisfying the relationship of $nx \geq nz > ny$.

The solution (A) prepared in the step A is coated onto an appropriate substrate.

A specific method for coating the solution (A) onto the substrate to form the retardation layer (A) may be performed in accordance with the method for forming the retardation layer (B) in the step C. However, the substrate onto which the solution (A) is to be coated is preferably a hydrophilic substrate, or a substrate having a surface subjected to hydrophilization treatment.

As the substrate, the substrates exemplified about the step C may be used. When the substrate is subjected to hydrophilization treatment, the methods exemplified about the step D may be appropriately adopted for this hydrophilization treatment.
[Step F]

The step F is a step for coating the solution (B) obtained in the step B onto the retardation layer (A) formed in the step E, thereby forming the retardation layer (B) having the index ellipsoid satisfying the relationship of $nx \geq ny > nz$.

A specific method for coating the solution (B) to form the retardation layer (B) may be performed in accordance with the method for forming the retardation layer (A) in the step D (provided that the hydrophilization treatment in the step D is unnecessary).

In the process of the present invention for producing an optical laminate, an aqueous solution is coated onto a surface of a water-insoluble retardation layer (B) to form a retardation layer (A) (production process example 1), or an organic solvent-based solution is coated onto a surface of a water-soluble retardation layer (A) to form a retardation layer (B) (production process example 2). In any one of the production process examples, the retardation layer formed earlier is not eroded with the solution coated onto the surface thereof. For this reason, according to the production process examples 1 and 2, uniform individual retardation layers that are small in unevenness in thickness can be formed.

The above-mentioned production processes have been exemplified about cases where a single retardation layer (A) and a single retardation layer (B) are formed. The process of the present invention for producing an optical laminate is not limited to the cases, where a single retardation layer (A) and a single retardation layer (B) are formed. About each of these layers, two or more layers may be formed. For example, an optical laminate made of three or more layers can be produced by coating a solution (A) for forming a retardation layer (A) and a solution (B) for forming a retardation layer (B) alternately.

<Application of Optical Laminate>

An application of the optical laminate of the present invention is not particularly limited, and typical examples thereof include a λ/4 plate, a λ/2 plate, and a viewing angle enlarging film of a liquid crystal display, and an antireflective film for flat panel displays. In an embodiment, the optical laminate is laminated onto a polarizer, whereby a polarizing plate can be produced. Hereinafter, this polarizing plate will be described.

The polarizing plate of the present invention is provided with at least the optical laminate of the present invention and a polarizer. The polarizing plate of the present invention may contain an appropriate substrate, a different retardation layer or any protective film besides the optical laminate of the present invention and the polarizer. For practical use, any appropriate adhesive layer is formed between any two of the individual layers as the constituting members of the polarizing plate. The polarizer is adhered onto the individual constituting members through one of the adhesive layers.

The polarizer is not particularly limited as far as having a function of converting a natural light or a polarized light into a linearly polarized light. As the polarizer, a conventionally known one can be adopted. As the polarizer, a drawn film having a polyvinyl alcohol-based resin containing iodine or a dichroic dye as a major component is preferably used. A thickness of the polarizer is typically from 5 μm to 50 μm.

As the above adhesive layer, an arbitrary suitable one can be selected as far as it adheres and integrates the surfaces of adjacent members with a practically sufficient adhering strength and an adhering time. Examples of the material for forming the adhesive layer include an adhesive agent, a pressure-sensitive adhesive agent, and an anchor coat agent. The adhesive layer may be a multiple-layer structure in which an anchor coat agent is coated on a surface of a body, and a adhesive agent or a pressure-sensitive adhesive agent is coated thereon, or may be a thin layer (also referred to as a hair line) that is unrecognizable by a naked human eye.

The adhesive layer arranged on one of both sides of the polarizer may be identical with or different from that arranged on the other thereof.

The angle made between the polarizer and the optical laminate adhered onto the polarizer in the polarizing plate may be appropriately set in accordance with the purpose. When the polarizing plate is used as, for example, an antireflective film, the angle made between the absorption axis direction of the polarizer and the slow axis direction of the optical laminate in the polarizing plate is preferably from 25° to 65°, and more preferably from 35° to 55°. When the polarizing plate is used as a viewing angle enlarging film, the angle made between the absorption axis direction of the polarizer and the slow axis direction of the optical laminate in the polarizing plate is substantially parallel or substantially orthogonal. In the present specification, the wording "substantially parallel" includes the meaning that the angle made between the absorption axis direction of the polarizer and the slow axis direction of the optical laminate is in the range of 0°±10°. The angle is preferably in the range of 0°±5°. The wording "substantially orthogonal" includes the meaning that the angle made between the absorption axis direction of the polarizer and the slow axis direction of the optical laminate is in the range of 90°±10°. The angle is preferably in the range of 90°±5°.

The optical laminate or the polarizing plate of the present invention is used preferably in the state that it is integrated into an image display. Examples of the image display include a liquid crystal display, an organic EL display, and a plasma display. Preferably, the optical laminate or the polarizing plate of the present invention is used in a liquid crystal display.

EXAMPLES

The present invention will be further described bellow by way of Examples and Comparative Examples. Here, the present invention is not limited to Examples. Each analysis method used in Examples is as follows.

(1) Method for Measuring Thickness:

When the thickness was less than 10 μm, it was measured by spectrophotometer for a thin film [trade name: "Multi Channel Photo Detector MCPD-2000", manufactured by Otsuka Electronics Co., Ltd.]. When the thickness was 10 μm or more, it was measured by using a digital micrometer, trade name: "KC-351C Model", manufactured by Anritsu Corporation.

(2) Method for Measuring Transmittance (T[590]), nx, ny, nz, Δn[590], and Nz Coefficient:

A product (trade name: "KOBRA 21-ADH") manufactured by Oji Scientific Instruments was used to measure the values at 23° C. An average refractive index was a value measured with an Abbe refractometer [trade name: "DR-M4", manufactured by Atago Co., Ltd.].

Synthesis Example 1

Synthesis of acenaphtho[1,2-b]quinoxaline-9-carboxylic acid

To a mixture of 10 g of purified acenaphthenequinoline and 8.4 g of 3,4-diaminobenzoic acid was added 500 mL of dimethylformamide. The reactant was continuously stirred at room temperature for 21 hours. The precipitation was filtrated to yield a crude product. This crude product was dissolved into heated dimethylformamide, and then the solution was again filtrated and the resultant was washed with dimethylformamide and water so as to be purified. In this way, acenaphtho[1,2-b]quinoxaline-9-carboxylic acid was synthesized.

Synthesis Example 2

Synthesis of Mixture of Ammonium 2-sulfoacenaphtho[1,2-b]quinoxaline-9-carboxylate and ammonium 5-sulfoacenaphtho[1,2-b]quinoxaline-9-carboxylate To 30% fuming sulfuric acid (15 mL) was added 3 g of acenaphtho[1,2-b]quinoxaline-9-carboxylic acid yielded in Synthesis Example 1 (see a reaction formula (c) illustrated below). The reactant was stirred at 70° C. for 17.5 hours. The resultant solution was diluted with 33 mL of water at 40 to 50° C., and further the solution was stirred for 12 hours. The precipitation was filtrated, thereby yielding a mixture containing 5-sulfoacenaphtho[1,2-b]quinoxaline-9-carboxylic acid and 2-sulfoacenaphtho[1,2-b]quinoxaline-9-carboxylic acid.

[Formula 7]

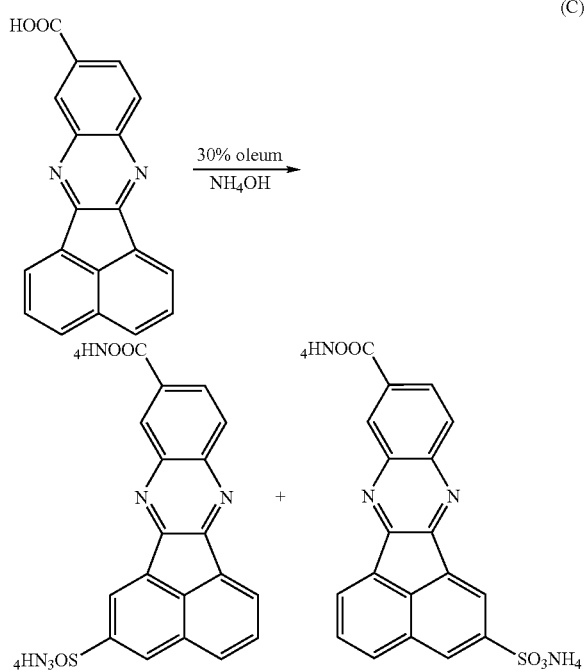

This mixture was dissolved into 2 litters of pure water (electric conductivity: 1.7 μS/cm), and ammonium hydroxide was further added thereto, so as to neutralize the acid with ammonium hydroxide. The resultant aqueous solution was put into a supplying tank, and then purified by use of a triple flat-membrane evaluating device equipped with a reverse osmotic membrane (product name: "NTR-7430" manufactured by Nitto Denko Corp.) until the electric conductivity of waste liquid in this device turned to 14.3 μS/cm (conversion to 1% by mass). Next, a rotary evaporator was used to adjust this purified aqueous solution to set the concentration of the polycyclic compound in the aqueous solution to 21.1% by mass. The thus-obtained aqueous solution was observed with a polarizing microscope. As a result, the solution exhibited a nematic liquid crystal phase at 23° C. By liquid chromatographic analysis, a blend ratio between ammonium 2-sulfoacenaphtho[1,2-b]quinoxaline-9-carboxylate and ammonium 5-sulfoacenaphtho[1,2-b]quinoxaline-9-carboxylate was quantitatively analyzed. As a result, the composition ratio was 46:54.

Synthesis Example 3

Into a reactor (500 mL) equipped with a mechanical stirrer, a Dean-Stark apparatus, a nitrogen-introducing tube, a thermometer, and a condenser tube were added 17.77 g (40 mmol) of 2,2'-bis(3,4-dicarboxyphenyl)hexafluoropropionic dihydride (manufactured by Clariant Japan K.K.) and 12.81 g (40 mmol) of 2,2-bis(trifluoromethyl)-4,4'-diaminobiphenyl (manufactured by Wakayama Seika Kogyo Co., Ltd.). Subsequently, thereto was added a solution wherein 2.58 g (20 mmol) of isoquinoline was dissolved in 275.21 g of m-cresol, and the resultant was stirred at 600 rpm at 23° C. for 1 hour, so as to yield a homogeneous solution. Next, an oil bath was used to heat the reactor to set the temperature of the inside of the reactor to 180±3° C. While the temperature was kept, the solution was stirred for 5 hours to yield a yellow solution. The solution was further stirred for 3 hours, and then the heating and the stirring were stopped. The resultant was naturally cooled to return the temperature to room temperature. As a result, a polymer in a gel form was precipitated.

Acetone was added to the yellow solution in the reactor to dissolve the gel completely. In this way, a diluted solution (7% by mass) was prepared. This diluted solution was added little by little to 2 litters of isopropyl alcohol while the alcohol was stirred. In this way, white powder was precipitated. This powder was collected by filtration, and put into 1.5 L of isopropyl alcohol so as to be washed. Furthermore, the same operation was repeated once more to wash the powder. Thereafter, the powder was again collected by filtration. This was dried in an air-circulating thermostatic oven 60° C. in temperature for 48 hours. Thereafter, the powder was dried at 150° C. for 7 hours to yield powder of a polyimide of a structural formula (IV) illustrated below with a yield of 85%. The weight-average molecular weight (Mw) of the polyimide was 124,000, and the imidation rate was 99.9%.

[Formula 8]

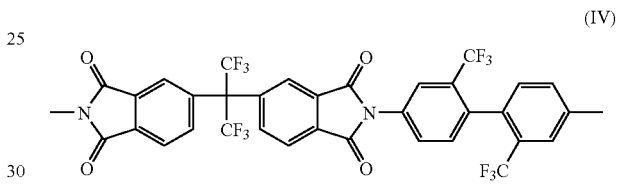

Example 1

An alkali glass plate (MATSUNAMI SLIDE GLASS; length and width: 45 mm×50 mm, and thickness: 1.3 mm) washed by ultrasonic waves (in acetone for 3 minutes and in ion exchange water for 5 minutes) was prepared. A spin coater was used to coat an imide-based polymer solution onto a surface of the alkali glass plate. The imide-based polymer solution (10% by mass solution in methyl isobutyl ketone) is a solution dissolving the polyimide yielded in Synthesis Example 3. The coating was performed at 500 rpm for 10 seconds and at 1000 rpm for 20 seconds. Next, on the hot plate, the resultant was dried at 80° C. for 5 minutes and at 120° C. for 30 minutes to form a first layer. The resultant first layer had a thickness of 5 μm. This first layer had an index ellipsoid satisfying a relationship of nx=ny>nz.

The surface of this first layer was subjected to corona discharge treatment (speed: 3 m/min., outputted power: 0.14 kW, discharge quantity: 156 W·min/m², and a number of operations for the treatment: one), so as to make the surface hydrophilic.

A bar coater (trade name: "mayer rot HS1.5" manufactured by Bushman Co.) was used to coat the aqueous solution yielded in Synthesis Example 2 onto the surface of the first layer subjected to the hydrophilization treatment in a thermostat 23° C. in temperature. Thereafter, the resultant was naturally dried to form a second layer. This second layer had a thickness of 0.4 μm. This second layer had an index ellipsoid satisfying a relationship of nx>nz>ny.

As described above, an optical laminate was produced wherein the first layer exhibiting "nx=ny>nz" and the second layer exhibiting "nx>nz>ny" were laminated on the surface of the glass plate.

A thickness of this optical laminate was 5.4 μm. A transmittance of this optical laminate at wavelength of 590 nm (T[590]) was 90%.

The first layer in Example 1 had an Rth[590] of 200 nm and a $\Delta n_{xz}[590]$ of 0.04.

The second layer had an Re[590] of 160 nm, a $\Delta n_{xy}[590]$ of 0.4, and an Nz coefficient of 0.17.

Example 2

A bar coater (trade name: "mayer rot HS1.5" manufactured by Bushman Co.) was used to coat the aqueous solution yielded in Synthesis Example 2 onto a surface of an alkali glass plate (MATSUNAMI SLIDE GLASS; length and width: 45 mm×50 mm, and thickness: 1.3 mm) washed by ultrasonic waves (in acetone for 3 minutes and in ion exchange water for 5 minutes) in a thermostat 23° C. in temperature. Thereafter, the resultant was naturally dried to form a first layer. This first layer had a thickness of 0.4 μm. This first layer had an index ellipsoid satisfying a relationship of nx>nz>ny.

In the same way as in Example 1, a spin coater was used to coat an imide-based polymer solution onto the surface of the first layer. The imide-based polymer solution (10% by mass solution in methyl isobutyl ketone) is a solution dissolving the polyimide yielded in Synthesis Example 3. The coating was performed at 500 rpm for 10 seconds and at 1000 rpm for 20 seconds.

Next, on the hot plate, the resultant was dried at 80° C. for 5 minutes and at 120° C. for 30 minutes to form a second layer. The resultant second layer had a thickness of 5 μm. This second layer had an index ellipsoid satisfying a relationship of nx=ny>nz.

As described above, an optical laminate was produced wherein the first layer exhibiting "nx>nz>ny" and the second layer exhibiting "nx=ny>nz" were laminated on the surface of the glass plate.

A thickness of this optical laminate was 5.4 μm. A transmittance of this optical laminate at wavelength of 590 nm (T[590]) was 90%.

The first layer in Example 2 had an Re[590] of 160 nm, a $\Delta n_{xy}[590]$ of 0.4, and an Nz coefficient of 0.17.

The second layer had an Rth[590] of 200 nm and a $\Delta n_{xz}[590]$ of 0.04.

What is claimed is:

1. An optical laminate, comprising:
   a retardation layer (A) comprising a polycyclic compound having at least one of a —SO₃M group and a —COOM group wherein M represents a counter ion, and having an index ellipsoid satisfying a relationship of nx≧nz>ny; and
   a retardation layer (B) having an index ellipsoid satisfying a relationship of nx≧ny>nz;
   wherein the retardation layer (B) comprises a water-insoluble polymer, and the optical laminate has a thickness of from 0.2 to 10 μm.

2. The optical laminate according to claim 1, wherein the polycyclic compound comprises a compound represented by the following formula (I):

[Formula 1]

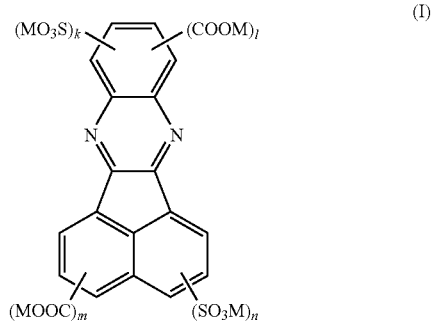

wherein M represents a counter ion, k, l, m and n each represent a number of substitutions, k and l are each an integer of from 0 to 4, and m and n are each an integer of from 0 to 6, provided that k, l, m and n are not simultaneously 0.

3. The optical laminate according to claim 1, wherein the water-insoluble polymer is at least one thermoplastic polymer selected from imide-based polymer, ester-based polymer, and amide-based polymer.

4. The optical laminate according to claim 1, wherein an in-plane birefringence index of the retardation layer (A) at wavelength of 590 nm ($\Delta n_{xy}[590]$) is 0.01 or more provided that $\Delta n_{xy}=nx-ny$ wherein nx represents a refractive index of the retardation layer (A) in a direction along which an in-plane refractive index of the retardation layer (A) is maximum (X axis direction), and ny represents a refractive index thereof in a direction orthogonal to the X axis direction in the plane (Y axis direction).

5. The optical laminate according to claim 1, wherein an Nz coefficient of the retardation layer (A) is from 0.1 to 0.9.

6. The optical laminate according to claim 1, wherein a birefringence index of the retardation layer (B) in the thickness direction thereof at wavelength of 590 nm ($\Delta n_{xz}[590]$) is 0.01 or more provided that $\Delta n=nx-nz$ wherein nx represents a refractive index of the retardation layer (B) in a direction along which an in-plane refractive index of the retardation layer (B) is maximum (X axis direction), and nz represents a refractive index of the retardation layer (B) in a direction orthogonal to the plane of the retardation layer (B).

7. The optical laminate according to claim 1, wherein an Nz coefficient of the retardation layer (B) is from 1.1 to 8.0.

8. A polarizing plate, comprising the optical laminate according to claim 1, and a polarizer.

9. An image display, comprising the optical laminate according to claim 1, or a polarizing plate comprising the optical laminate and a polarizer.

10. A process for producing an optical laminate, comprising:
   a step A of dissolving a polycyclic compound having at least one of a —SO₃M group and a —COOM group wherein M represents a counter ion into an aqueous solvent, thereby preparing a solution exhibiting a liquid crystal phase;
   a step B of preparing a solution containing a water-insoluble polymer and an organic solvent;
   a step C of coating the solution obtained in the step B onto a substrate, thereby forming a retardation layer (B) having an index ellipsoid satisfying a relationship of nx≧ny>nz; and a step D of subjecting a surface of the retardation layer (B) to hydrophilization treatment, and then coating the solution obtained in the step A thereon, thereby forming a retardation layer (A) having an index ellipsoid satisfying a relationship of nx≧nz>ny.

11. A process for producing an optical laminate, comprising:
a step A of dissolving a polycyclic compound having at least one of a —SO₃M group and a —COOM group wherein M represents a counter ion into an aqueous solvent, thereby preparing a solution exhibiting a liquid crystal phase;
a step B of preparing a solution containing a water-insoluble polymer and an organic solvent;
a step E of coating the solution obtained in the step A onto a substrate, thereby forming a retardation layer (A) having an index ellipsoid satisfying a relationship of nx≧nz>ny; and
a step F of coating the solution obtained in the step B onto a surface of the retardation layer (A), thereby forming a retardation layer (B) having an index ellipsoid satisfying a relationship of nx≧ny>nz.

12. The process for producing an optical laminate according to claim 10, wherein the polycyclic compound comprises a compound represented by the following formula (I):

[Formula 2]

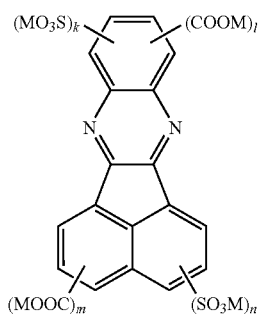

(I)

wherein M represents a counter ion, k, l, m and n each represent a number of substitutions, k and l are each an integer of from 0 to 4, and m and n are each an integer of from 0 to 6, provided that k, l, m and n are not simultaneously 0.

13. The process for producing an optical laminate according to claim 11, wherein the polycyclic compound comprises a compound represented by the following formula (I):

[Formula 2]

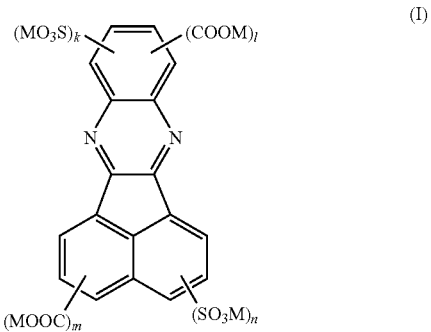

(I)

wherein M represents a counter ion, k, l, m and n each represent a number of substitutions, k and l are each an integer of from 0 to 4, and m and n are each an integer of from 0 to 6, provided that k, l, m and n are not simultaneously 0.

* * * * *